May 22, 1956 E. G. JOHANSSON 2,747,050
SHUNT SWITCH FOR PLUG-IN METER SOCKET AND THE LIKE
Filed July 28, 1953 2 Sheets-Sheet 1

Inventor
Ernest G. Johansson
by Roberts, Cushman & Grove
att'ys.

Inventor
Ernest G. Johansson
by Roberts, Cushman & Grover
attys.

United States Patent Office 2,747,050
Patented May 22, 1956

2,747,050

SHUNT SWITCH FOR PLUG-IN METER SOCKET AND THE LIKE

Ernest G. Johansson, Belmont, Mass., assignor to Anchor Manufacturing Company, Boston, Mass., a corporation of Massachusetts Application July 28, 1953, Serial No. 370,775

5 Claims. (Cl. 200—51.10)

This invention relates to sockets or meter mounting boxes of the kind disclosed in my pending application for meter socket Serial No. 187,000 filed September 27, 1950.

The socket illustrated therein has spaced terminal jaws adapted to receive in bayonet fashion the terminals of the meter and a bridge piece spanning the gap between the socket terminals which is alternately movable into bridging position or open position to short the current through the socket when the meter is removed and to open the circuit so that the current will pass through the meter when the latter is installed in the socket.

The bridge piece is in the form of a heavy shunt bar, and yieldable means having contact with the bar normally urges it to bridging position so that current will flow through the socket from one terminal to the other, thus preserving the current in the house circuit while the meter is removed for inspection and/or repair. A plunger associated with socket has a part engaged with the bar and another part projecting into the path of the meter as it is inserted into the socket to displace the bar in opposition to the yieldable means and hence to permit passage of the current through the meter rather than from terminal to terminal by way of the shunt bar when the latter is installed.

The principal objects of the invention are to provide a socket of composite construction to facilitate repair in situ, by replacement of unit parts at least portions of which are interchangeable, which is of such construction as to adapt it to molding procedure, to produce economically a structure which is sturdy, durable and highly satisfactory. A further object is to provide a structure which will minimize arcing at the terminals during separation from and installation of the meter in the socket. Another object is to provide a structure which will signify closing of the house circuit through the shunt upon removal of the meter and making the circuit through the meter upon restoration thereof to the socket.

In accordance with the invention and in one aspect thereof the terminals, and shunt bar, are mounted as unit assemblies on independent blocks of insulation which are detachably attached to a meter and base plate so that they may be removed and replaced as units in event of failure of one part or another thus facilitating repair in situ without carrying away the entire socket box to a repair shop. The units are three in number, there being two duplicate outside or end units which are interchangeable and an intermediate unit with which the end units abut and are held engaged.

In accordance with a further aspect of the invention there is yieldable means displaceable by interengagement of the terminals of the meter and socket when the meter is installed to effect an impetus at separation of the terminals upon withdrawal of the meter from the socket. The yieldable means is in the form of a flat cantilever spring with the free end of which the lower end of the plunger is engaged. The spring normally occupies an elevated position, is displaced by the plunger during installation of the meter and during withdrawal of the meter imparts an impetus to the plunger which effects an abrupt separation of the terminals and hence minimizes arcing.

In still another aspect of the invention an audible signal is provided to indicate when the shunt switch is closed during removal of a meter and when it is opened during insertion of a meter into the socket. In the preferred embodiment the aforesaid spring is constructed to emit a loud click when it flexes in either direction. In this way the meter man knows when the switch opens or closes even though the switch is not visible because of the intervening meter, thereby removing a very common objection to a so-called blind shunting switch in a meter socket.

The invention will now be described in greater detail with reference to the accompanying drawings wherein.

Figure 1:
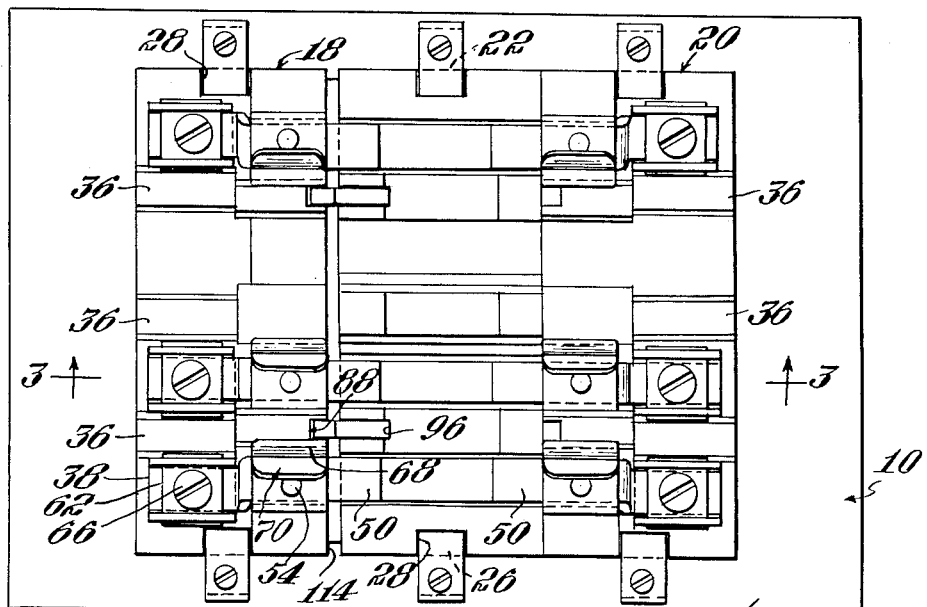
Fig. 1 is a plan view of the socket.
Figure 2:
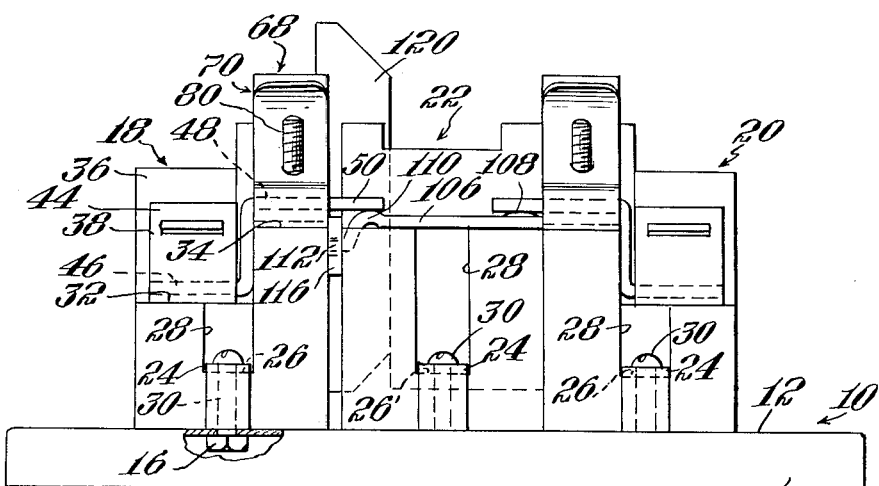
Fig. 2 is a side elevation of Fig. 1.

Watt-hour meters and the like electric meters such as are used for measuring and recording the current supply both for domestic and commercial electric installations frequently require inspection for repair and/or replacement. The meter mechanism is commonly housed in a receptacle, which may be transparent, from which stem a plurality of terminal blades which are engageable in bayonet fashion with correspondingly situated terminal jaws of a socket for receiving the meter, which is permanently installed at the junction of the source of current supply with the installation. Usually when the meter is removed for any of the reasons mentioned above the circuit is interrupted so that the manufacturer or householder is without current for an interval depending upon the time required to make an inspection or a replacement. To avoid this current interruption a switch or bridge was designed to span or close the gap between the socket terminals when the meter was removed to shunt the current through the socket thereby to continue the supply of current to the circuit while the meter was removed and to be moved out of shunting position or opened by reinstallation of the meter into the socket thereby automatically to restore passages of current through the meter.

While the aforesaid meter is eminently satisfactory from the standpoint of construction and operation the metermen object to using meters of that kind because of the element of uncertainty as to whether the circuit is actually open after the meter has been installed. It was of course quite clear to the meterman when he removed the meter, by inspection, that the switch or bridge piece was in shunting position but when he replaced the meter the meter itself concealed the bridge piece so that he was blind as to whether the circuit was reestablished through the meter, particularly if no current was being drawn at that time. To be universally acceptable it was therefore highly desirable to provide some sort of signal indicative of a positive opening of the shunt switch so as to assure the meterman that it was in proper position for recording following installation. A further inconvenience characteristic of the aforesaid meter socket and other sockets of that kind is that if repair is required it is necessary to remove the entire socket, take it to a shop, replace damaged parts or rebuild it and then return it for reinstallation. Consequently it was necessary to keep a large stock of meter sockets on hand for substitution during rebuilding or repairing operations.

The foregoing disadvantages have been largely overcome by the present novel construction, wherein the socket has signal means incorporated therein indicative of the condition of the socket and wherein the socket is comprised of unit parts interchangeably replaceable in situ thereby minimizing repair costs, reducing time consumed in making replacements and making it possible to get along with a fewer number of meter sockets at any given time.

Referring to the drawings, the socket has a rigid substantially rectangular sheet metal base 10 have a flat top 12 and a vertical skirt 14, the lower edge of which affords a footing for the base. The upper or top of the base has a plurality of threaded openings 16 located at suitable places to receive means for anchoring the socket parts thereto which in accordance with the desire to provide for easy replacement is comprised of three component parts in the form of blocks 18, 20 and 22 of which the blocks 18 and 20 are of identical construction. The blocks 18, 20 and 22 as will shortly appear are designed to receive the component parts of the socket terminals and shunting switch in cooperative fashion when mounted together and anchored to the base, and yet to permit ready replacement of one part or another by the simple expedient of removing the anchoring means of the damaged unit and replacing it in situ by a new part of corresponding kind. The blocks are attached to the base in abutting relation by means of right-angle anchor pieces 24. To this end a recess 28 is formed in each end of each block which has a horizontal shoulder 26 at its bottom. An angle piece is placed opposite the recess at each end of each block with one arm resting on the shoulder 26 and the other resting on the top surface of the base whereupon a screw 30 is inserted through a hole in the one arm and threaded into one of the holes 16 in the base.

Figure 3:
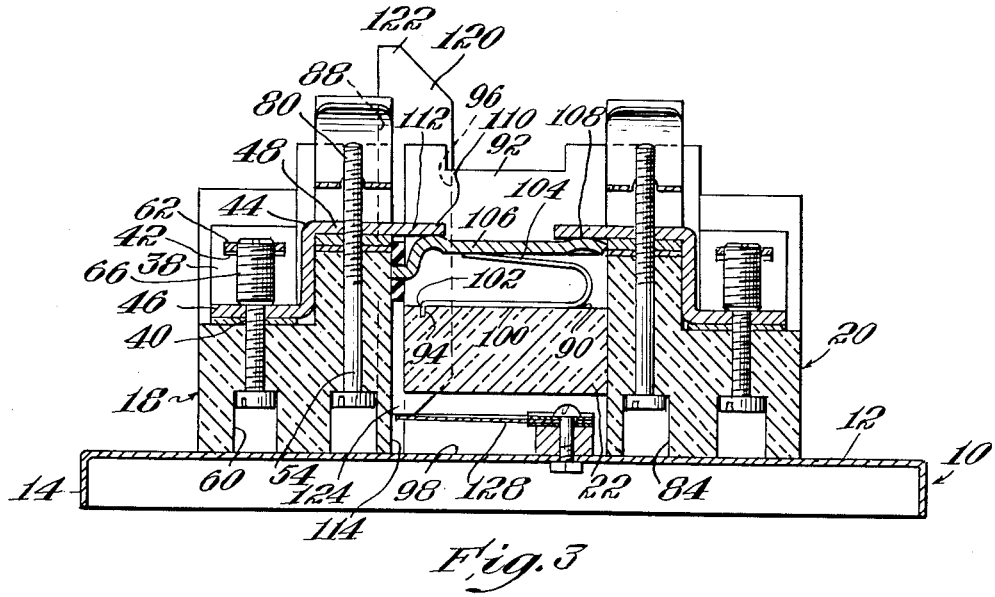
Fig. 3 is a vertical section taken on the line 3—3 of Fig. 1 showing the shunting switch in gaping closing position as when the meter is removed.
Figure 4:
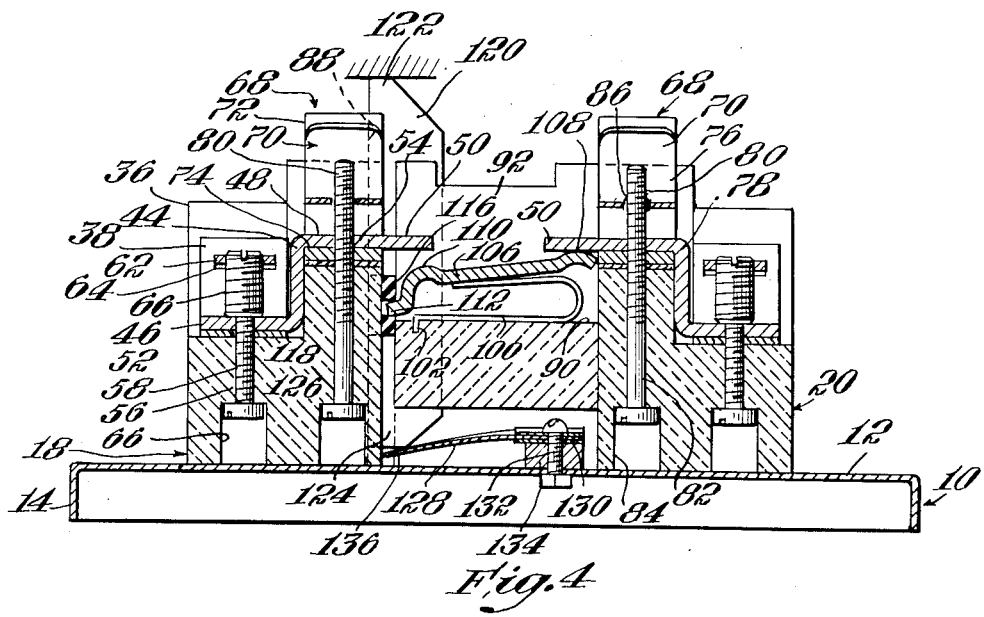
Fig. 4 is a corresponding vertical section showing the shunting switch in open position as when the meter is installed.

Since the blocks 18 and 20 are of identical construction the description will be confined to one. Referring to Figs. 3 and 4 the block 18 is substantially rectangular and has vertically stepped upper surfaces 32 and 34 which are horizontal and extend transversely of the block. The stepped surfaces 32 and 34 are divided to provide compartments or recesses for receiving the terminals by vertical walls 36 spaced transversely thereof, there being three in number so that transversely of the block there are two outside compartments or recesses, and two intermediate compartments or recesses. The number of recesses may of course be varied in accordance with the number of terminals required, and a block that has a plurality of recesses may be used as a single or multiple socket depending upon whether one or more terminal elements are fastened in the recesses.

In each recess or in so many as is desired there is placed on the horizontal shoulder 32 a rigid U-shaped binding post 38 for receiving and clamping a cable end. The binding post 38 has a threaded opening 40 in its bottom and oppositely disposed registering slots 42 near the upper ends of its legs. A heavy substantially Z-shaped copper bus-bar 44 is placed in each recess with one leg 46 located between the legs of the binding post 38 at the bottom thereof and the other leg 48 overlying the horizontal shoulder 34 and having a forwardly or inwardly projecting end 50 extending beyond the inner face of the block 18. The arms 46 and 48 have threaded openings 52 and 54. The binding post 38 and arm 46 of the bus-bar are anchored securely to the block in the recess by a screw 56 which extends upwardly from the bottom of the block through a vertical hole 58 and is threaded into the parts. The underside of the block is countersunk at 60 to receive the head of the screw. A rigid crossbar or strut 62 is placed between the upper ends of the binding post 38 with its ends in the slots 42 and has a threaded opening 64 in which there is mounted a heavy threaded stud or screw 66. The screw 66 provides means for firmly forcing the end of a cable placed between it and the bottom of the binding post 38 so as to make good electrical connection between the cable and the bus-bar.

A pair of female jaws are mounted on the upper shoulder 34 of each recess and comprise jaw elements 68 and 70. Jaw element 68 is comprised of heavy copper bar stock of substantially the same weight as the bus-bar and has a straight vertical leg 72 and a right-angle foot 74.

The jaw element 70 is of much lighter stock substantially half as thick as the jaw 68, and has a vertically disposed curved leg 76 and a right angular foot 78. The arm 48 of the bus-bar is vertically spaced above the shoulder 34 sufficiently to receive beneath it the combined thickness of the feet 74 and 78 of the jaws 68 and 70 superposed with the foot of the jaw 70 subjacent to the foot of the jaw 68. The feet of both jaws are pierced and they and the arm 48 of the bus-bar are anchored firmly to the shoulder 34 by a screw 54 extending upwardly through a hole 82 in the block from the underside and threaded into the arm 48. The lower end of the hole 82 is countersunk at 84 to receive the head of the screw. As thus fastened within the recess, the vertical arm 72 of the jaw 68 abuts throughout the major portion of its length, the vertical surface of the partition wall 36 dividing the recess from the next, and the vertically extending arm 76 of the jaw 70 extends upwardly from the bottom of the recess and then toward the jaw 68, converging with the jaw 68 at a place of substantial contact therewith near the upper end of the jaw and then diverging so as to form parted lips at the upper extremity of the jaws for reception of the bayonet type terminals carried by the meter.

The jaw 70 has in it an elongate opening 86, through which an extended portion 80 of the screw 54 extends and affords an abutment limiting the yield of the jaw 70 to a predetermined maximum.

The inner surface of each of the blocks 18 and 20, that is the surfaces which abut the opposed surfaces of the block 22, have in them one or more vertically arranged grooves or guides 88, the grooves being located at places where the partition walls 36 are situated so that the grooves extend upwardly along the inner edges of these walls.

The intermediate block 22 is of substantially rectangular shape and has in its top a plurality of recesses 90 divided from each other by partition walls 92, the recesses and dividing walls being located in a line with the recesses and dividing walls of the blocks 18 and 20. In the bottom of each recess near one end there is a transverse vertical slot 94 and in the same end of the block there are one or more vertical grooves 96 located at the place of the partition walls so as to be opposite the grooves 88 of the block 18.

In each of the recesses of the block 22 or in so many as there are terminal elements in the blocks 18 and 20 there is located a flat hairpin spring having a horizontal foot 100 resting on the bottom of the recess provided with an anchoring tab 102 fitted into the slot 94 and a spring arm 104 rising upwardly from the foot. With each spring is associated a switch bar or bridge piece 106 comprised of heavy copper bar comparable to the bus-bar stock, having at one end a spherical button 108 for contact with the underside of the forwardly projecting portion 50 of the bus-bar carried by the block 20 and at its opposite end a cylindrically shaped transversely extending rib 110 for contact with the underside of the forwardly projected portion 50 of the bus-bar carried by the block 18. When the blocks 18, 20 and 22 are assembled together, as shown in Figs. 3 and 4, the bridge piece 106 rests on the spring arm 104 and is yieldably held thereby against the undersides of the opposed portion 50—50 of the bus-bars in the absence of means constraining the bridge piece from having such contact. The bridge piece is disengaged from one of the bus-bar terminal ends by downward displacement about the pivot point afforded by the button 108.

In order to effect disengagement of the bridge piece about the button as a pivot it has a downwardly and forwardly projecting lip 112 which extends beyond the face of the block 22 into a vertical space 114 which is maintained between the blocks 18 and 22 by suitable disposition of the openings 16 in the base 10 through which the attaching screws are passed for fastening the blocks to the base. Within the space 114 which extends transversely between the blocks there is also located for vertical sliding movement a rigid, flat electrically non-conductive bar 116 which has in it a plurality of spaced openings 118 corresponding in number to the bridge pieces and of such size as to accommodate the lips 112 at the ends of the bridge pieces. One or more plunger members 120 are placed between the blocks 18 and 22 comprised of flat, electrically non-conductive, rigid material, the opposite edges of which are slidably engaged with the opposed slots 88 and 96 of the blocks. Each plunger has an upwardly extending end 122 which projects beyond the upper extremities of the jaws and a lower end 124. Along one edge of each plunger there is a recess 126 of such size to accommodate and embrace the upper and lower edges of the bar 116. As thus constructed vertical movement of the plunger or plungers if more than one is used will through the intermediary of the bar 116 control the positions of the ends of the bridge pieces so that by depression of the plungers 120 the ends of the bridge pieces may be separated from the bus-bars and by elevating the plungers 120 the bridge pieces may be restored to contact with the bus-bars and held thereagainst by the spring arms 104. This provides a convenient means for automatically shunting the current through the bus-bars when the meter is removed from the socket and then restoring current through the meter when it is replaced, for when the meter is inserted in the socket it strikes the plungers 120 depressing them and thereby separating the bridge pieces from the bus-bars, holding them separated against opposition of the spring arms as long as the meter is in position. When however the meter is removed spring arms 104 restore the bridge pieces to contact with the bus-bars and at the same time elevate the plungers 120 where they remain until again depressed by replacing the meter.

In accordance with that aspect of the invention concerned with signalling the opened and closed positions of the bridge pieces the block 22 has at its underside a recess 98 which is open at one end of the block and a wide, flat, cantilever spring 128, is mounted on the base within the recess with one end anchored to the base by a bolt 132 and spacer 134 and the other free end 136 underlying the lower end 124 of one of the plungers 120. Deflection of the spring from its normally straight position produces a loud snap and restoration of the spring from its deflected position to its straight position, results in another loud snap. When the plungers 120 are undepressed, that is when the meter has been removed and the bridge pieces have contact with the bus-bars so as to conduct current between the jaw terminals of the socket, the spring 128 occupies a straight nearly horizontal position and the lower end of one of the plungers 120 rests thereon, being supported in part thereby. In fact the spring 128 acts in concert with the spring arms 104 to hold the bridge pieces in firm contact with the bus-bar. When the plungers 120 are depressed by introduction of the meter the lower end of one of them deflects the spring 128 with the result that there is a loud snap, indicative of the fact that the bridge pieces have been separated from the bus-bars, thereby redirecting the current through the meter. Thus it is possible for the meterman to be certain that the bridge pieces have been separated from the bus-bars and current is redirected through the meters, even though he cannot see parts of the switch, which are concealed by placing the meter in the socket. When the meter is removed the spring arms 104 and the spring 128 in concert therewith move the bridge pieces into shunting position, elevate the plungers 120 and the spring 128 produces a loud snap indicative of the fact that the bridge pieces are now in shunting position, thus relieving the meterman from having to examine the socket to be sure that the switch parts are in shunting position.

The aforesaid construction of the socket affords certain additional beneficial characteristics, namely reduction of arcing as the meter is removed from the socket and reduction of short-circuiting between adjacent bus-bars and jaws. The first is attained though the supplemental spring action produced by the spring 128 which acting in concert with the spring arms 104 imparts impetus to the movement of the plunger 120 in contact therewith as the meter is removed which effects rapid and decisive separation of the meter from the socket, thereby reducing arcing. Short-circuiting between adjacent bus-bars and sockets is inhibited by the shielding effect of the plungers themselves which are interposed therebetween, the plungers being comprised of an electric insulating material which affords a barrier to the jump of current across the gap between adjacent terminals.

As heretofore pointed out the blocks 18 and 20 are identical and may be substituted one for the other, thus it is evident that a minimum number of replacement parts are required for stock, and by removably attaching them and the intermediate block 22 to the base plate 10 so as to be individual units each carrying component parts of the terminal elements, it is evident that repair or replacement may be made in situ with a minimum of delay and difficulty. The blocks 18, 20 and 22 are designed to be comparatively simple in shape and hence to be particularly susceptible to manufacture by molding processes using electrically insulating material such as Bakelite, porcelain, plastic, wood, etc.

The component parts of the jaws, bus-bars, and springs are comprised of flat, copper bar stock, or equivalent electrically conductive material of very elementary shape hence involving the least amount of forming and diework so as to be consistent with economy of construction. Furthermore the parts may be assembled and disassembled with ease and with no more than a common screwdriver for a tool.

With all of the foregoing advantages as recited it is apparent that an extremely compact, reliably operative socket for meters is afforded.

It should be understood that the present disclosure is for the purpose of illustration only and that this invention includes all modifications and equivalents which fall within the scope of the appended claims.

I claim:

1. In a socket for use with a meter having a base and contact blades extending rearwardly therefrom, the combination of a support including two sections of insulation with a gap therebetween, terminals mounted on the support, the terminals having jaws to receive said blades from the front and contact surfaces facing rearwardly, a rigid bar extending across said gap with its ends engaging said surfaces respectively at opposite sides of the gap, a spring urging the bar forwardly against the surfaces, a guide groove on the face of one of said sections which faces the other section, the grooves extending lengthwise of said jaws, and means for moving said bar from one of said surfaces, said means including a plunger slidable in said groove with its outer end projecting forwardly beyond the ends of the jaws into the path of the meter base, whereby when the meter is inserted in the socket the plunger, urged by the meter base, moves the bar away from a contact surface.

2. In a socket for use with a meter having a base and contact blades extending rearwardly therefrom, the combination of a support including two sections of insulation with a gap therebetween, pairs of terminals mounted on the support with the terminals of each pair located opposite each other on said sections respectively, each pair of terminals having jaws to receive said blades from the front and contact surfaces facing rearwardly, a rigid bar extending across said gap at each pair of terminals with its ends engaging said surfaces respectively at opposite sides of the gap, a spring urging the bar forwardly against the surfaces, a plurality of plunger guides extending lengthwise of said jaws at spaced locations between said sections, and means for moving each of said bars from one of said surfaces, said means including a plurality of plungers slidable in said guides with their outer ends projecting forwardly beyond the ends of the jaws into the path of the meter base, whereby when the meter is inserted in the socket the plungers, urged by the meter base, move the bars away from said contact surfaces.

3. In a socket for use with a meter having a base and contact blades extending rearwardly therefrom the combination of a support including two sections of insulation with a gap therebetween, pairs of terminals mounted on the support with the terminals of each pair located opposite each other on said sections respectively, each pair of terminals having jaws to receive said blades from the front and contact surfaces facing rearwardly, a rigid bar extending across said gap at each pair of terminals with its ends engaging said surfaces respectively at opposite sides of the gap, a spring urging the bar forwardly against the surfaces, a plurality of guide grooves on the face of one of said sections which faces the other section, the grooves extending lengthwise of said jaws at spaced locations along said face, and means for moving each of said bars from one of said surfaces, said means including a plurality of plungers slidable in said grooves with their outer ends projecting forwardly beyond the ends of the jaws into the path of the meter base, whereby when the meter is inserted in the socket the plungers, urged by the meter base, move the bars away from said contact surfaces.

4. In a socket for use with a meter having a base and contact blades extending rearwardly therefrom the combination of a support including two sections of insulation with a gap therebetween, pairs of terminals mounted on the support with the terminals of each pair located opposite each other on said sections respectively, each pair of terminals having jaws to receive said blades from the front and contact surfaces facing rearwardly, a rigid bar extending across said gap at each pair of terminals with its ends engaging said surfaces respectively at opposite sides of the gap, a spring urging the bar forwardly against the surfaces, a plurality of plunger guides extending lengthwise of said jaws at spaced locations between said sections, means for moving each of said bars from one of said surfaces, said means including a plurality of plungers slidable in said guides with their outer ends projecting forwardly beyond the ends of the jaws into the path of the meter base, the plungers having openings aligned with each other, and a cross-bar extending through said openings.

5. In a socket for use with a meter having a base and contact blades extending rearwardly therefrom, the combination of a support including two sections of insulation with a gap therebetween, pairs of terminals mounted on the support with the terminals of each pair located opposite each other on said sections respectively, each pair of terminals having jaws to receive said blades from the front and contact surfaces facing rearwardly, a rigid bar extending across said gap at each pair of terminals with its ends engaging said surfaces respectively at opposite sides of the gap, a spring urging the bar forwardly against the surfaces, a plurality of guide grooves on the face of one of said sections which faces the other section, the grooves extending lengthwise of said jaws at spaced locations along said face, means for moving each of said bars from one of said surfaces, said means including a plurality of plungers slidable in said grooves with their outer ends projecting forwardly beyond the ends of the jaws into the path of the meter base, the plungers having openings aligned with each other, and a cross-bar extending through said openings.

References Cited in the file of this patent

UNITED STATES PATENTS

| Number | Name | Date |
|---|---|---|
| Re. 15,548 | Barnes | Feb. 20, 1923 |
| 1,046,227 | Seemann | Dec. 3, 1912 |
| 1,384,491 | Simmon | July 12, 1921 |
| 1,482,833 | Averill | Feb. 5, 1924 |
| 2,044,643 | Sloop | June 16, 1936 |
| 2,126,602 | Bakke | Aug. 9, 1938 |
| 2,192,826 | Cole | Mar. 5, 1940 |
| 2,231,737 | Rutter | Feb. 11, 1941 |
| 2,368,914 | Bowen | Feb. 6, 1945 |
| 2,448,166 | Adams | Aug. 31, 1948 |
| 2,548,760 | Allgeyer | Apr. 10, 1951 |

FOREIGN PATENTS

| Number | Country | Date |
|---|---|---|
| 691,333 | Germany | May 23, 1940 |